US011168799B2

(12) United States Patent
Stier et al.

(10) Patent No.: US 11,168,799 B2
(45) Date of Patent: Nov. 9, 2021

(54) MANIFOLD VALVE BODY AND METHOD FOR PRODUCING THE MANIFOLD VALVE BODY

(71) Applicant: GEMUE Gebr. Mueller Apparatebau GmbH & Co. Kommanditgesellschaft, Ingelfingen (DE)

(72) Inventors: Peter Stier, Doerzbach (DE); Juergen Wagner, Niedernhall (DE)

(73) Assignee: GEMUE Gebr. Mueller Apparatebau GmbH & Co. Kommanditgesellschaft, Ingelfingen (DE)

( * ) Notice: Subject to any disclaimer, the term of this patent is extended or adjusted under 35 U.S.C. 154(b) by 53 days.

(21) Appl. No.: 16/002,523

(22) Filed: Jun. 7, 2018

(65) Prior Publication Data

US 2018/0356843 A1    Dec. 13, 2018

(30) Foreign Application Priority Data

Jun. 8, 2017    (DE) .................... 10 2017 112 667.8

(51) Int. Cl.
*F16K 11/22* (2006.01)
*F16K 37/00* (2006.01)
(Continued)

(52) U.S. Cl.
CPC ............ *F16K 11/22* (2013.01); *B23P 15/001* (2013.01); *F16K 7/126* (2013.01); *F16K 11/20* (2013.01); *F16K 27/003* (2013.01); *F16K 27/0236* (2013.01); *F16K 27/0263* (2013.01); *F16K 37/0041* (2013.01); *G05B 19/416* (2013.01); *G05D 7/0641* (2013.01); *G06K 7/10386* (2013.01); *G06K 19/041* (2013.01);
(Continued)

(58) Field of Classification Search
CPC ....... Y10T 137/87885; Y10T 137/5283; F16K 27/003; F16K 11/22; F16K 37/0041; G06K 19/041
See application file for complete search history.

(56) References Cited

U.S. PATENT DOCUMENTS

| 5,616,829 A | 4/1997 | Balaschak |
| 2006/0022056 A1* | 2/2006 | Sakama ................. G06K 19/04 235/492 |

(Continued)

FOREIGN PATENT DOCUMENTS

| CN | 203224896 U | 10/2013 |
| DE | 10201300224 A1 | 8/2014 |

(Continued)

OTHER PUBLICATIONS

German Office Action dated Oct. 18, 2018, p. 1-8.

*Primary Examiner* — Atif H Chaudry
(74) *Attorney, Agent, or Firm* — Bond Schoeneck & King, PLLC; George McGuire

(57) ABSTRACT

A valve body (4) for a valve assembly (2) is proposed. The valve body (4) comprises a valve seat (96) which can be accessed by means of an opening (86). A plurality of threaded holes is provided around the opening (86). A plurality of first studs (22a-c) is arranged, in portions, in the threaded holes in order to arrange a valve drive. At least one second stud (24) comprises an electronic data carrier (26) for contactless identification of the valve seat (96). A portion of the second stud (24) is arranged in one of the threaded holes.

7 Claims, 4 Drawing Sheets

(51) Int. Cl.
*G06K 19/04* (2006.01)
*F16K 27/00* (2006.01)
*G06K 19/07* (2006.01)
*F16K 11/20* (2006.01)
*F16K 7/12* (2006.01)
*F16K 27/02* (2006.01)
*B23P 15/00* (2006.01)
*G05B 19/416* (2006.01)
*G05D 7/06* (2006.01)
*G06K 7/10* (2006.01)

(52) U.S. Cl.
CPC .................. *G06K 19/0723* (2013.01); *G05B 2219/41303* (2013.01); *Y10T 137/5283* (2015.04); *Y10T 137/87885* (2015.04)

(56) References Cited

U.S. PATENT DOCUMENTS

| | | | | |
|---|---|---|---|---|
| 2009/0058610 | A1* | 3/2009 | Krebs | F15B 13/0867 340/10.1 |
| 2010/0071776 | A1* | 3/2010 | Ringer | F16K 7/126 137/12 |
| 2011/0226365 | A1* | 9/2011 | Equit | F16K 7/14 137/861 |
| 2012/0326885 | A1 | 12/2012 | McCarty | |
| 2014/0263606 | A1* | 9/2014 | Vasichek | F15B 19/005 235/375 |
| 2016/0162771 | A1* | 6/2016 | Mueller | G06K 19/0723 235/492 |

FOREIGN PATENT DOCUMENTS

| | | | | |
|---|---|---|---|---|
| DE | 102013214304 A1 | 1/2015 | | |
| DE | 102014005553 A1 | 10/2015 | | |
| EP | 2366922 A2 | 9/2011 | | |
| JP | 2007162805 A | 6/2007 | | |
| KR | 100832162 B1 * | 5/2008 | | |
| KR | 100832162 B1 | 5/2008 | | |
| WO | WO-2015010810 A1 * | 1/2015 | ....... G06K 19/07758 |
| WO | 2016192970 A1 | 12/2016 | | |

\* cited by examiner

MANIFOLD VALVE BODY AND METHOD FOR PRODUCING THE MANIFOLD VALVE BODY

CROSS-REFERENCE TO RELATED APPLICATIONS

This application relates and claims priority to German Application No. DE 102017112667.8, filed Jun. 8, 2017, the entire disclosure of each of which is incorporated herein by reference.

BACKGROUND OF THE INVENTION

The invention relates to a manifold valve body and to a method for producing the manifold valve body.

Multi-way valve bodies for fluid technology processes are generally known. Complex welded structures in which individual valve bodies, each having a valve seat, are interconnected by means of tubes can be replaced by a manifold valve body. Using multi-way valve bodies reduces the outlay for assembly and validation. Furthermore, multi-way valve sets offer advantages in terms of fluid technology, since for example dead space in line portions that are otherwise necessary is reduced.

It is known that a clear association between individual valve elements within a central management unit is possible by means of an electronic data carrier.

However, constraints due to function, design and production do not allow the electronic data carrier to be provided at every point of a manifold valve body. In particular when producing multi-way valve bodies, it is not always possible to arrange an electronic data carrier directly on the manifold valve body, for example on a surface. This is in particular due to the variety and the complexity of the design of individual multi-way valve bodies.

The object of the invention is therefore that of providing a manifold valve body which allows contactless identification of a valve seat.

SUMMARY OF THE INVENTION

The object of the invention is achieved by a manifold valve body, and by a method for producing the manifold valve body.

A manifold valve body for a valve assembly is proposed, the manifold valve body comprising a plurality of valve seats which can be accessed by means of respective openings, a plurality of threaded holes being provided around each opening, a plurality of first studs being arranged, in portions, in the threaded holes in order to arrange a valve drive. Advantageously, a second stud comprises an electronic data carrier for contactless identification of the valve seat. A portion of the second stud is arranged in one of the threaded holes.

The valve seat can thus be clearly wirelessly identified by means of the second stud. At the same time, this identification function is associated with a fastening function, thus providing a solution that saves installation space and is cost-effective.

Moreover, during production of the manifold valve body, arranging the electronic data carrier with respect to the valve seat is isolated from steps to be carried out earlier. Accordingly, the electronic data carrier can be arranged as late as at the end of production, which increases the degree of freedom during manufacture. Furthermore, multi-way valve bodies that are already owned by customers can be retrofitted.

BRIEF DESCRIPTION OF THE DRAWINGS

Further advantages and features can be found in the following description of embodiments, and in the drawings, in which.

DETAILED DESCRIPTION

Figure 1:
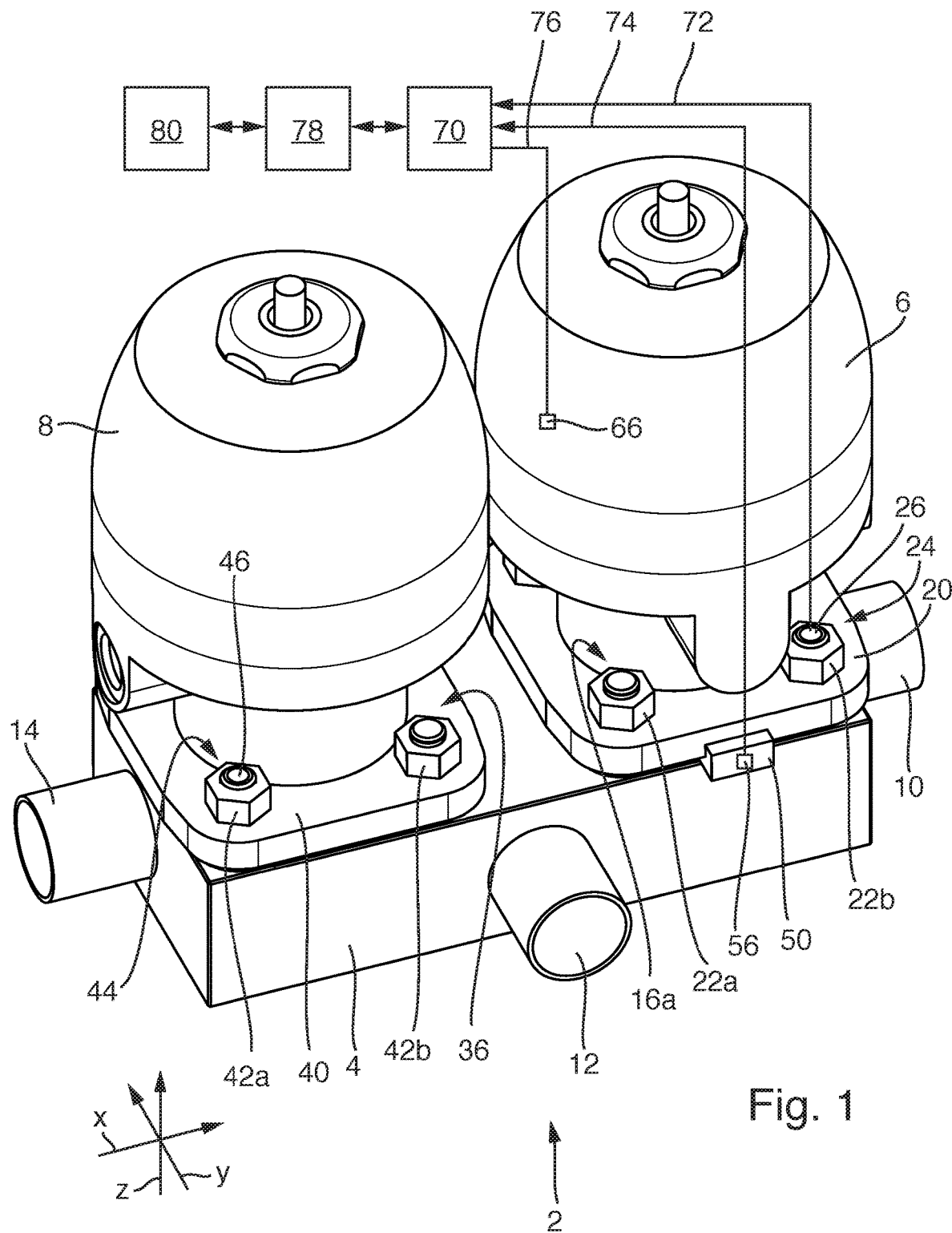
FIG. 1 is a perspective view of a valve assembly.

FIG. 1 is a perspective view of a valve assembly 2 that comprises a manifold valve body 4 and two valve drives 6 and 8 that are arranged on the manifold valve body 4. By actuating the valve drives 6 and 8, respective diaphragms are pushed against a valve seat on a sealing web, and the flow of the flowing process fluid between the valve connections 10, 12 and 14 is thus controlled or shut off. Examples of process fluids include gases and liquids. The manifold valve body 4 is produced from stainless steel, for example. The manifold valve body 4 shown in the drawings is just one of a plurality of possible embodiments of a manifold valve body. A customized manifold valve body can therefore also comprise further valve connections, valve seats, and fluid passages arranged therebetween. The valve connections, valve seats and fluid passages can also have different dimensions.

A portion of a first stud 16a is screwed into a threaded hole of the manifold valve body 4, and projects from the manifold valve body 4 by such a distance as to protrude through a through-hole of a flange 20 of the first valve drive 6 in order to fix the first valve drive 6 to the manifold valve body 4 by means of a nut 22a. At the same time, the associated diaphragm is clamped between the manifold valve body 4 and the first valve drive 6. A portion of a second stud 24 is screwed into a threaded hole of the manifold valve body 4 and comprises an electronic data carrier 26 for contactless identification of the valve seat.

A portion of a third stud 36a is screwed into a further threaded hole of the manifold valve body 4, and projects from the manifold valve body 4 by such a distance as to protrude through a through-hole of a flange 40 of the second valve drive 8 in order to fix the second valve drive 8 to the manifold valve body 4 by means of a nut 42a. At the same time, the associated diaphragm is clamped between the manifold valve body 4 and the second valve drive 8. A portion of a fourth stud 44 is screwed into one of the further threaded holes of the manifold valve body 4 and comprises a further electronic data carrier 46 for contactless identification of the valve seat.

The diaphragm clamped between the manifold valve body 4 and the first valve drive 6 comprises a tab 50 which projects outwards and in which an electronic data carrier 56 is arranged. An electronic data carrier 66 is arranged on the valve drive 6 at a suitable position (shown here only schematically). Identifications 72, 74 and 76 can be read out by means of a mobile reader 70 in order to be combined in a central management unit 78. The central management unit 78 communicates with a network unit 80 that is arranged in a wide area network. The use of the first valve drive 6 jointly with a particular diaphragm on the valve seat that can be identified by the stud 24 is saved in the central management unit 78, allowing the individual components to be tracked and inventoried during operation. The network unit 80 allows the individual components to be tracked until production.

The data carriers 26, 46, 56, 66 can be any electronic component on which data can be stored and read out again. In particular, the data carrier 26, 46, 56, 66 can be what is known as an RFID chip (RFID=radio frequency identification), which generally comprises a transponder in which data can be written, which data can then be read out by a reader by using electrical waves or pulses.

Figure 2:
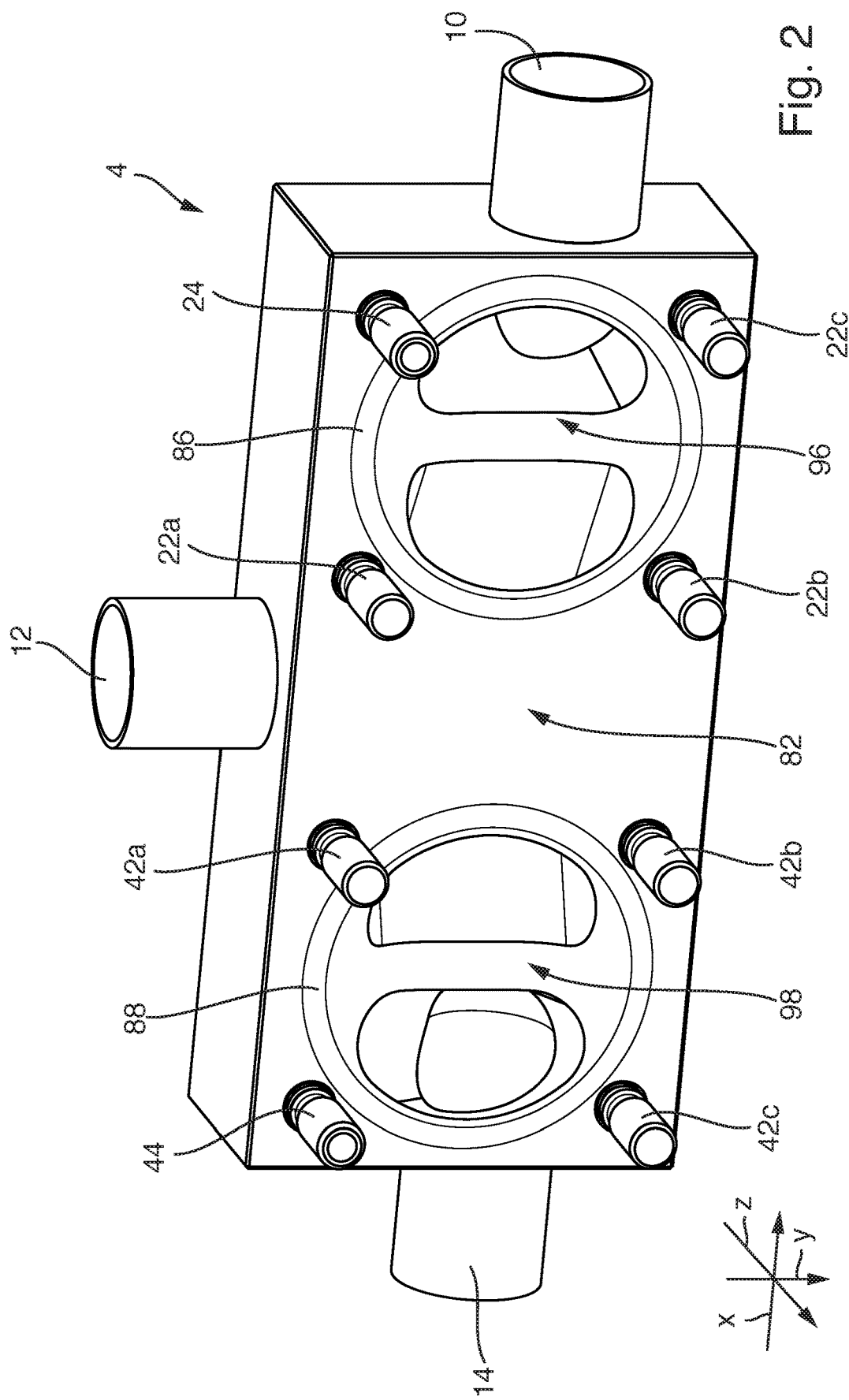
FIG. 2 is a perspective view of a manifold valve body.

FIG. 2 is a perspective view of the manifold valve body 4 without the valve drives 6 and 8. A surface 82 is interrupted by two openings 86 and 88. The openings 86 and 88 allow the valve seats 96 and 98, respectively, to be seen. The openings 86 and 88 are peripherally closed, in a fluid-tight manner, by means of the associated clamped diaphragm. The studs 22a to 22c and 24 are arranged around the opening 86 so as to be equally spaced from one another. The studs 44a to 42c and 44 are arranged around the opening 88 so as to be equally spaced from one another.

Of course, the manifold valve body 4 can comprise further openings and associated valve seats, as well as further connections, and can be adapted for use by the customer. Accordingly, multi-way valve bodies 4 of complex designs are also included in this description.

Figure 3:
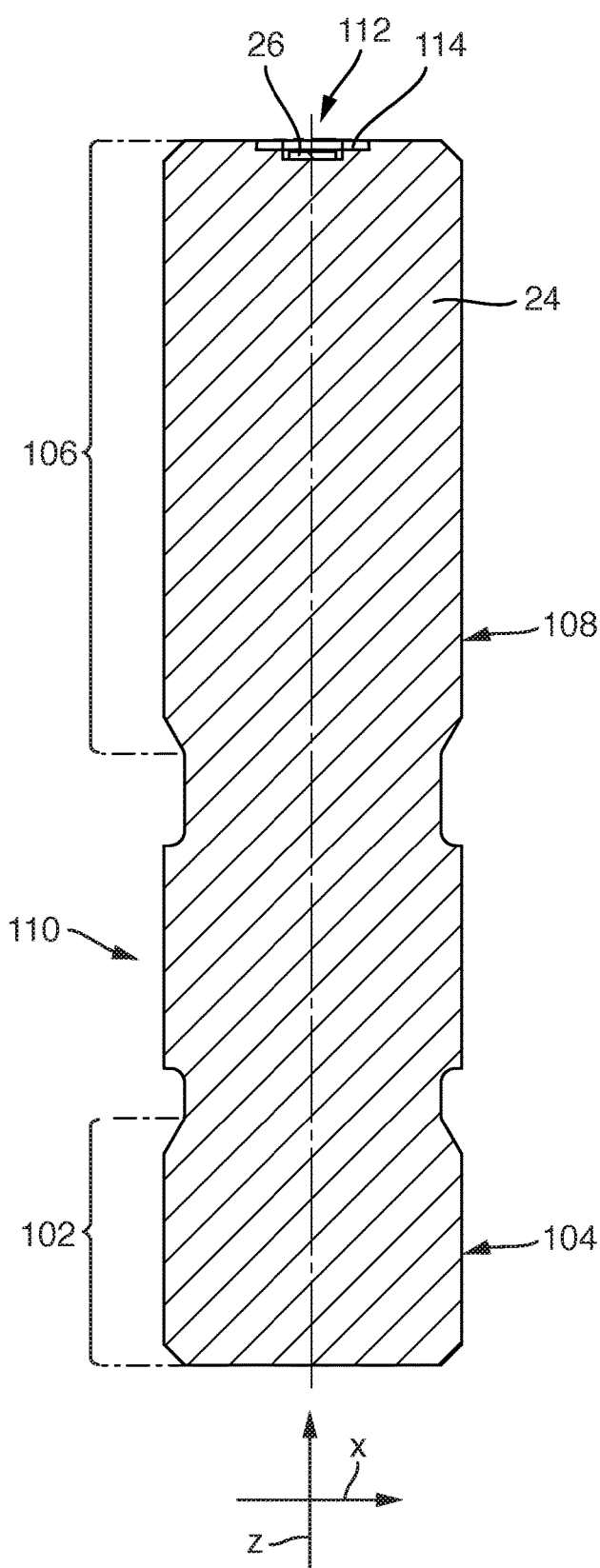
FIGS. 3 and 4 are each a cross-sectional view of a stud.
Figure 4:
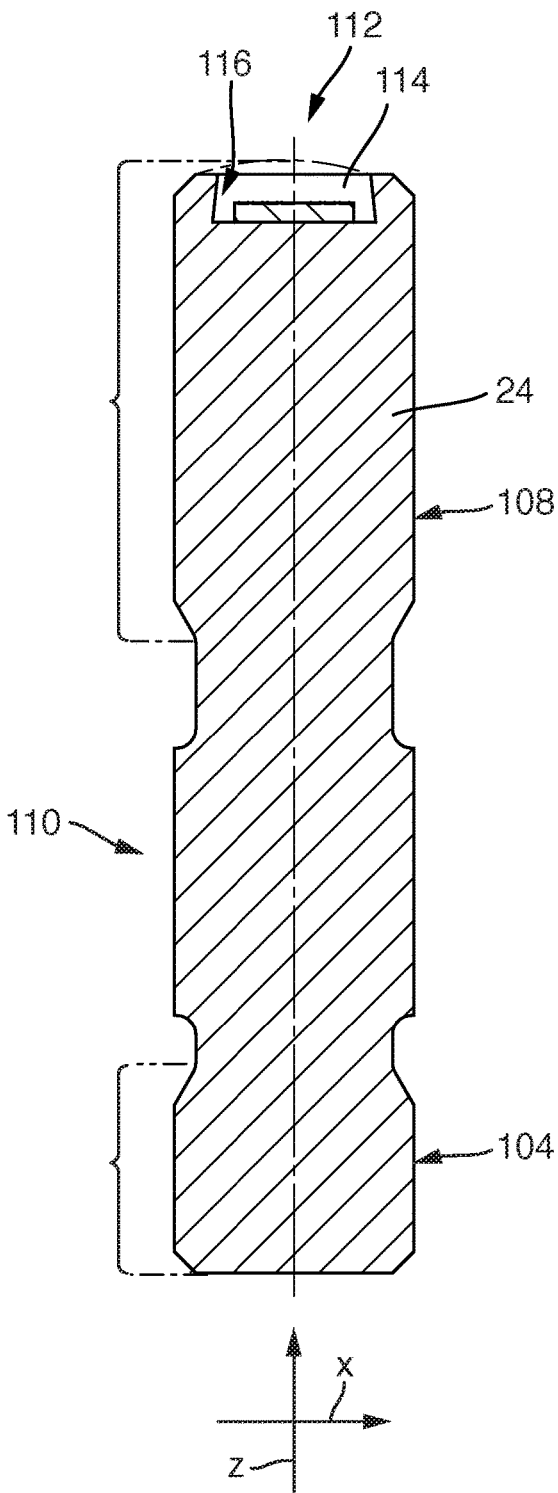

FIGS. 3 and 4 are each a cross-sectional view of a particular embodiment of the stud 24. The stud 44 is constructed in a similar manner. The stud 24 comprises a first distal portion 102 that has a first external thread 104. A second distal portion 106 comprises a second external thread 108. An intermediate portion 110 functionally separates the two distal portions 102 and 106. The distal portion 106 comprises a distal recess 112 which is sealed by a protective layer 114.

In FIG. 3, the distal recess 112 has two steps, and the electronic data carrier 26 is arranged in the proximal step. The distal step advantageously allows improved adhesion of the protective layer 114. In FIG. 4, the distal recess 112 comprises an undercut 116 that increases in the proximal direction. The undercut 116 advantageously allows the protective layer 114 to be arranged in the recess 112 in a form-fitting manner.

In order to produce the stud 24, the electronic data carrier 26 is first introduced into the recess 112 and arranged on the base thereof, and optionally adhesively bonded thereto. A casting compound, such as epoxy resin, is then metered into the recess 112. The metered casting compound is then cured for a curing period of at least 10 minutes, in particular at least 15 minutes, in an oven at a curing temperature of over 100° C., in particular of over 130° C. In a further embodiment, the stud 24 is cured in the oven at 150° for one hour. The distal recess 112 is thus sealed by the protective layer 114 in a fluid-tight manner. At the same time, the protective layer 114 is not electrically conductive and is not magnetizable, and therefore the electronic data carrier 26 can be wirelessly addressed through the protective layer 114.

Figure 5:
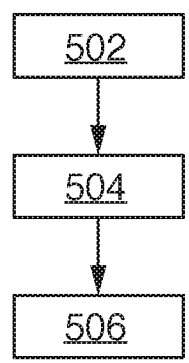
FIG. 5 is a schematic flow diagram.

FIG. 5 is a schematic flow diagram for producing the manifold valve body 4. Before the steps described below are carried out, the manifold valve body 4 already has a valve seat 96, 98 that can be accessed by means of one opening 86, 88, respectively. In a first step 502, a plurality of threaded holes is provided around each opening 86, 88. In a second step 504, a plurality of first studs 22a, 24b, 22c and/or a plurality of third studs 42a, 42b, 42c is arranged, in portions, in the threaded holes. In a third step 506, a portion of a second stud 24 and/or of a fourth stud 44 is arranged in one of the threaded holes.

What is claimed is:

1. A valve assembly for processing of process fluids comprising:
a manifold valve body comprising a plurality of valve seats which are accessible by means of respective openings, a plurality of threaded holes being provided around each opening, a plurality of studs being arranged, in portions, in the threaded holes in order to arrange a valve drive on the relevant opening, wherein at least one of the studs that is associated with the relevant opening comprises a first electronic data carrier for contactless identification of the relevant valve seat, wherein the first electronic data carrier is accessible from the outside of the valve assembly, and wherein the valve body is formed in the nature of a one-piece manifold;
a plurality of valve drives associated with the plurality of valve seats, wherein a second electronic data carrier is arranged on each of the valve drives, and wherein the second electronic data carrier is accessible from the outside of the valve assembly; and
a plurality of diaphragms clamped between the manifold valve body and the associated valve drive closing the associated opening peripherally in a fluid-tight manner, each of the plurality of diaphragms comprising a tab projecting outwards and in which a third electronic data carrier is arranged, wherein the third electronic data carrier is accessible from the outside of the valve assembly.

2. The valve assembly according to claim 1, wherein the stud comprising the electronic data carrier comprises a distal recess, wherein the electronic data carrier is arranged inside the distal recess, and wherein the distal recess is sealed by means of a protective layer.

3. The valve assembly according to claim 2, wherein the stud comprising the electronic data carrier comprises a first external thread in a first distal portion, wherein a second distal portion comprises a second external thread and the distal recess, and wherein the first distal portion of the stud that comprises the electronic data carrier is received in the associated threaded hole of the manifold valve body.

4. The valve body assembly according to claim 2, wherein the distal recess has two steps, and wherein the electronic data carrier is arranged in the proximal step of the distal recess.

5. The valve assembly according to claim 2, wherein the distal recess comprises an undercut that increases in the proximal direction.

6. The valve assembly according to claim 1, wherein the electronic data carrier is an RFID chip.

7. The valve assembly according to claim 1, wherein the RFID chip is discoid.

* * * * *